Figure 1:
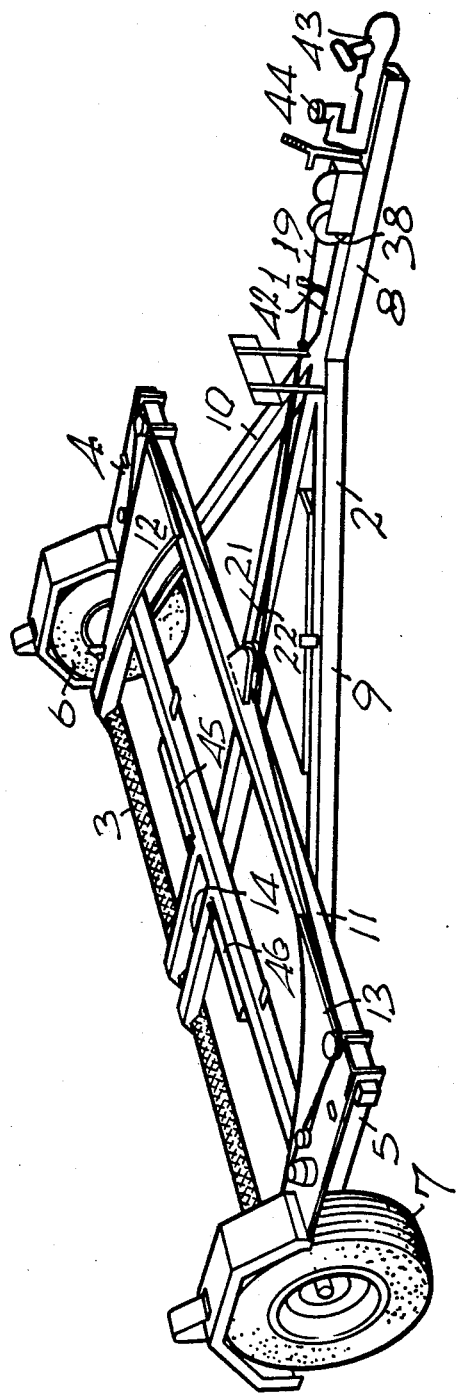

United States Patent [19]

Baines

[11] Patent Number: 4,921,390
[45] Date of Patent: May 1, 1990

[54] MOTOR VEHICLE TOWING DEVICE

[76] Inventor: Ronald J. Baines, 12 Moore Avenue, Salisbury East, Adelaide, 5000, Australia

[21] Appl. No.: 61,123

[22] Filed: Jun. 10, 1987

[30] Foreign Application Priority Data

Dec. 11, 1985 [AU] Australia .................. PH3827

[51] Int. Cl.⁵ .................................. B60P 3/12
[52] U.S. Cl. .................... 414/483; 280/402; 414/563
[58] Field of Search ............... 414/563, 483, 484, 485, 414/426; 280/402

[56] References Cited

U.S. PATENT DOCUMENTS

| | | | |
|---|---|---|---|
| 2,411,183 | 11/1946 | Baldwin | 414/483 |
| 2,628,733 | 2/1953 | Hale | 414/483 |
| 2,701,069 | 2/1955 | Hawkins | 414/563 |
| 3,547,290 | 12/1970 | Fratzke et al. | 414/483 |
| 3,945,521 | 3/1976 | Decker | 414/483 |
| 4,490,089 | 12/1984 | Welker | 414/483 |

FOREIGN PATENT DOCUMENTS 2098176 7/1978 Australia.
8050682 8/1983 Australia.

*Primary Examiner*—Mitchell J. Hill
*Attorney, Agent, or Firm*—Bruce L. Adams; Van C. Wilks

[57] ABSTRACT

A motor vehicle towing aid in which the vehicle to be towed can be rolled directly onto a lowered frame assembly which also includes a turntable like assembly relative to ground engaging wheel which frame assembly can afterwards be lifted relative to the wheels for towing of the motor vehicle.

8 Claims, 6 Drawing Sheets

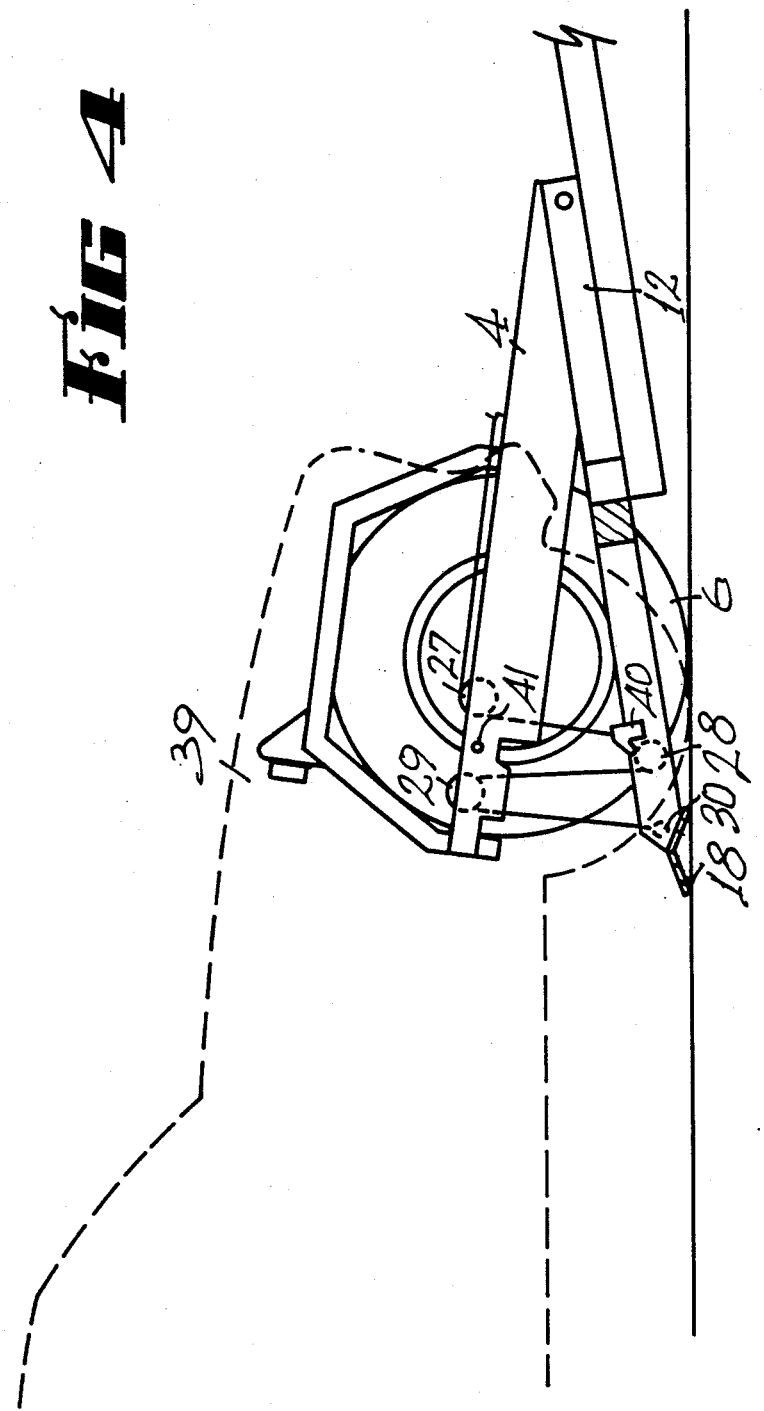

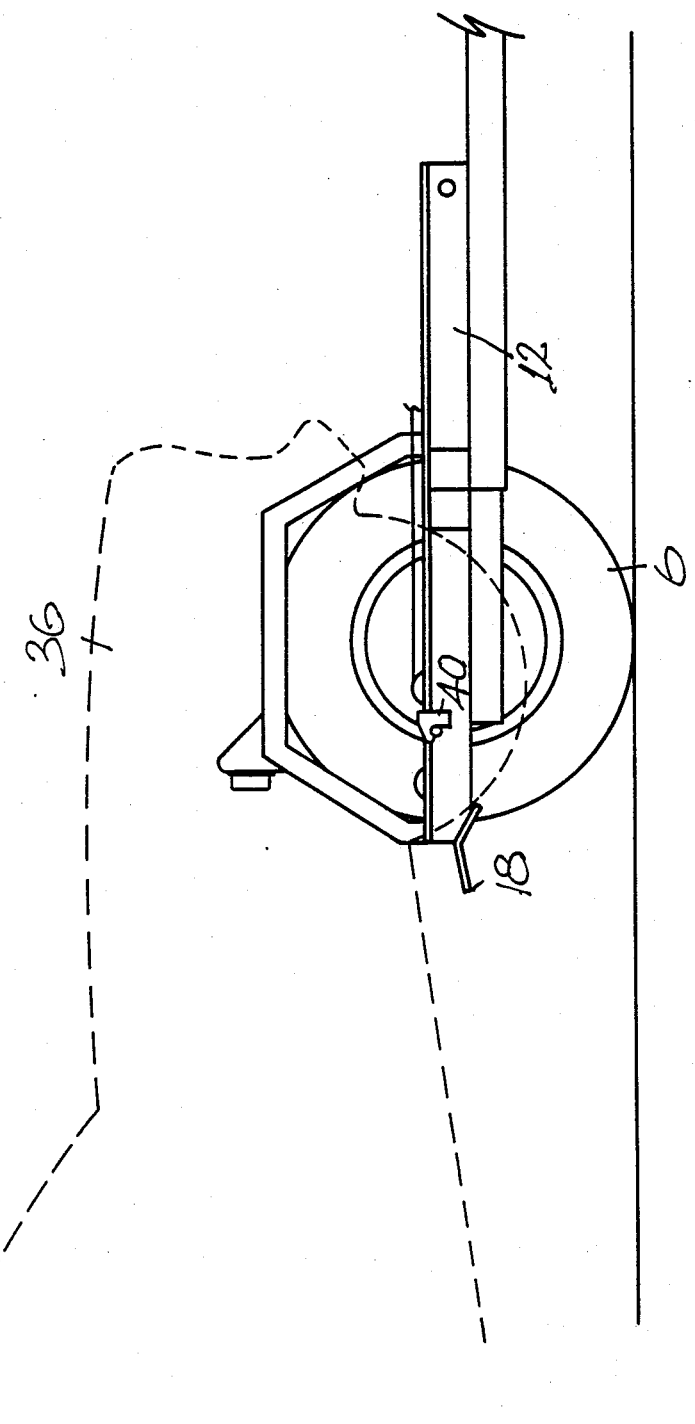

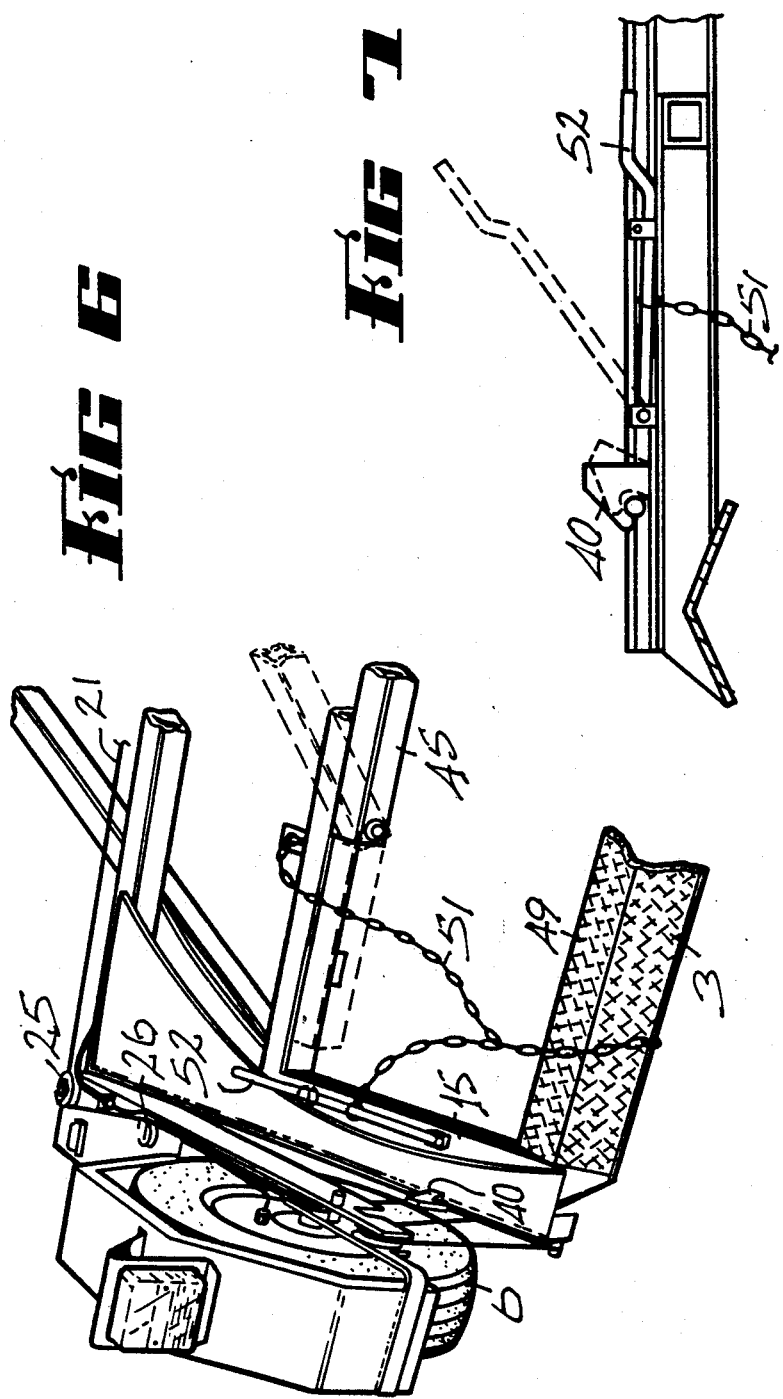

MOTOR VEHICLE TOWING DEVICE

This invention relates to vehicle towing aids.

This invention is directed to a towing aid in which a front two or back two wheels of a motor vehicle only are supported by a towing aid and thereby lifted from ground engagement which is provided as a part of the towing aid.

An example of the type of device being discussed is that described in Australian Patent 521,004 in the name of "Mobi-Jack (Proprietary) Limited".

The problem to which this invention is directed is to provide a towing aid which can be manufactured somewhat more economically than a device such as that disclosed in Australian Patent 521,004 but which can still offer at least a number of the advantages.

The so-called "Mobi-Jack" uses a rearwardly extendable frame onto a part of which the respective wheels of the vehicle to be towed are located and then the frame itself is tilted and eventually the motor vehicle wheels are drawn back over the ground engagable wheels.

This accordingly requires at least four functional elements including means to provide for tilting of the frame, the means to allow for extension rearwardly of a frame element providing for support of the motor vehicle, means to then draw this back with the vehicle thereon, and finally means to lift the ground engagable wheels when the vehicle is being supported.

According to this invention, I have discovered that it is possible to significantly simplify the arrangement by providing a towing aid that includes ground engaging wheels together with a frame assembly which is adapted to be positioned, by relative positioning between the ground engaging wheels and the frame assembly, adjacent the ground in one position whereby either the front or rear wheels of a vehicle can be positioned thereon, and adpated to be raised to a position substantially above the said first position whereby to hold the said wheels of the vehicle appropriately during towing of the vehicle, and a supporting frame upon which the wheels of the vehicle to be towed are directly supportable which supporting frame is supported at its outer ends with respect to a towing frame such, however, as to allow for relative rotational movement of the supporting frame about a central substantially vertical axis.

In preference, the supporting frame is positioned relative to ground engagable wheels such that the wheels of a motor vehicle will be supportable at a location in an adjacent vicinity of such wheels.

In preference, the supporting frame is positioned so that the wheels of a motor vehicle being supported will be locatable between respective ground engagable wheels where such ground engagable wheels comprise at least one wheel to each side of the supporting frame.

In preference, the supporting frame is located between ground engagable wheels on each side of the supporting frame and is positioned to be below an uppermost height of any of the respective ground engagable wheels when the towing aid is supported on a horizontal plane.

In preference, the ground engagable wheels are supported by a rearwardly extending arm which is pivotally supported with respect to the towing frame at a position forward of the respective ground engagable wheel and adapted to be rotatable about a substantially transversely orientated horizontal axis.

In preference, there are means extending between the respective ground engagable wheels and the towing frame such that the towing frame can be lowered from a towing position to a vehicle wheel receiving position and raise this again lifting any expected additional weight provided by a vehicle to be towed.

Figure 2:
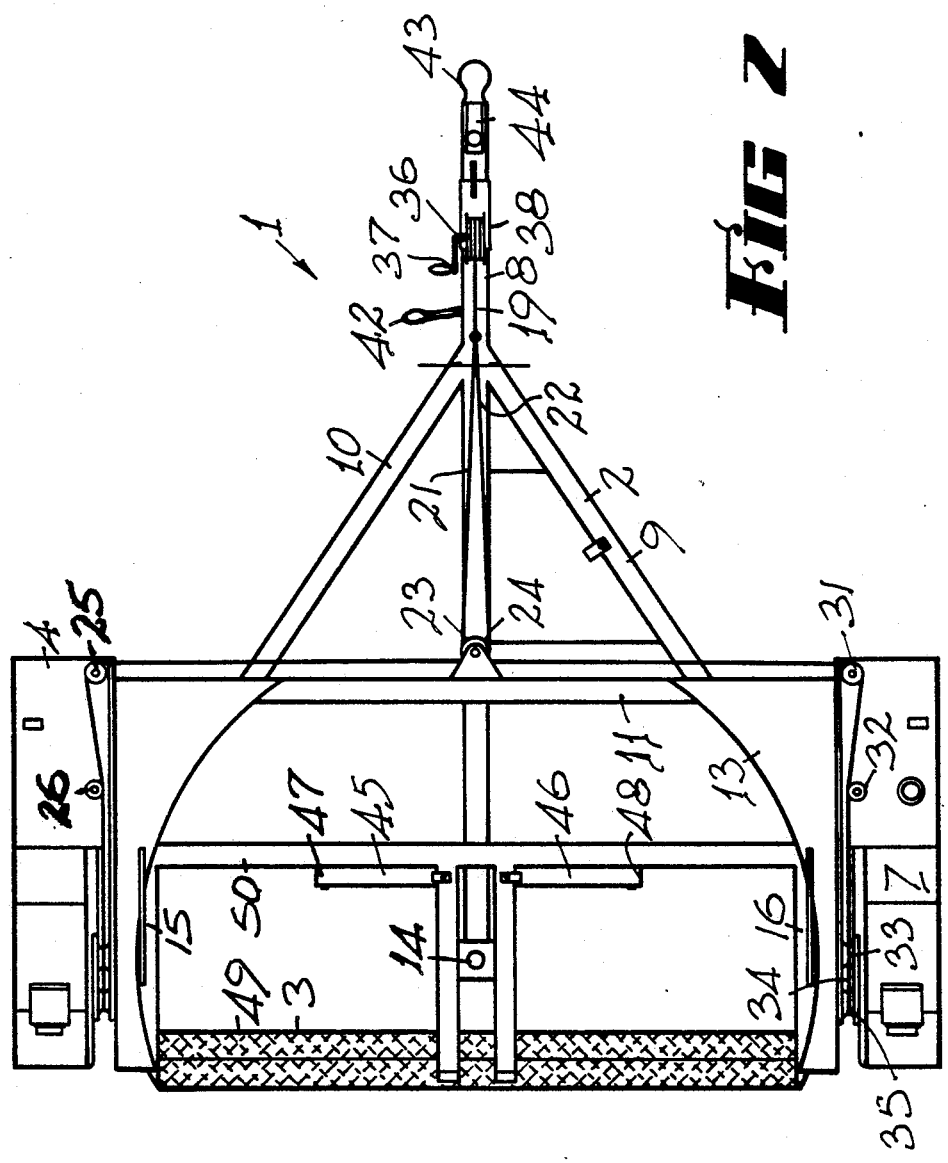
Figure 3:
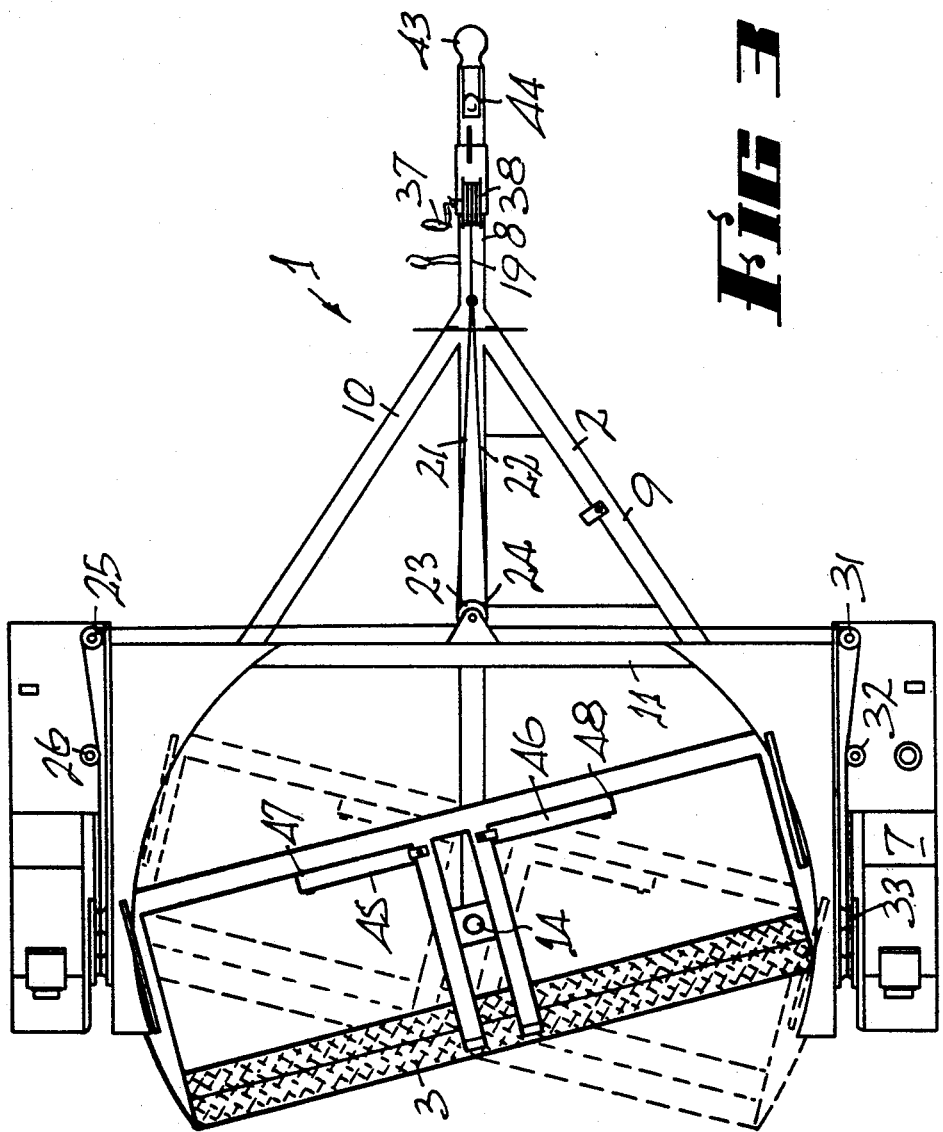

For a better understanding of this invention it will now be described with the assistance of drawings in which:

FIG. 1 is a perspective view of a vehicle towing aid according to the preferred embodiment, FIG. 2 is a planned view of the same embodiment as shown in FIG. 1, FIG. 3 is the same plan view as in FIG. 2 except that a supporting frame is shown in an alternate position with a further alternate position being shown in dotted outline, FIG. 4 is a side elevation showing somewhat schematically in cross-section a portion of the supporting frame and the towing frame when the towing aid is in a wheel-receiving position and the supporting frame is in the lowermost position, there being an outline of a motor vehicle, FIG. 5 is the same as in FIG. 4 but showing the towig aid in a towing position with the supporting frame raised to be coincident with the alignment of the towing frame and providing the position supporting the front wheels of the motor vehicle and shown in outline, FIG. 6 is a perspective view of the one side of the assembly comprising the embodiment as shown in the previous figures, and FIG. 7 is a cross-sectional view in detail of a part of the supporting frame.

Referring in detail to the drawings the vehicle towing aid 1 is constituted by a towing frame assembly 2, a supporting or support frame 3 and by reason of rearwardly extending lever arms 4 and 5, ground engagable wheels 6 and 7.

The towing frame assembly 2 is constituted by a central frame member 8, and strengthening diagonal members 9 and 10 which collectively provide support for lateral member 11 and rearwardly extending frame parts 12 and 13.

The rearwardly extending frame parts 12 and 13 provide an arcuately shaped support base for the outer ends of the centrally pivoted supporting frame 3.

The supporting frame 3 is adapted to be pivoted about axis 14 which is vertically orientated and such that the outer ends 15 and 16 are positioned and have a lowermost part such as at 17 which rests on for slidable movement there around, the respective rearwardly extending frame parts 12 and 13.

The towing frame assembly 2 together with the supporting frame 3 is adapted to be lowered to a wheel-receiving position so that the rearmost edge of the supporting frame at 18 can in fact lie adjacent the ground as specifically shown in FIG. 4.

The arrangement for achieving such raising and lowering is effected by a cable system including a cable 19 extending to two cables 21 and 22 these passing around pulleys 23 and 24 and thereafter cable 22 extending around pulley 25, past guide pulley 26 and then around pulley 27 pivotally secured about the rearwardly extending lever arm 4, around pulley 28 comprising one of the rearwardly extending frame parts namely 12, back around pulley 29 pivotally secured to the rearwardly extending arm 4 and finally being anchored at 30 which is a part of the rearwardly extending frame part 12.

Cable 21 likewise extends around pulleys 31, 32, 33, 34 and 35 being anchored at the rearwardmost end of the rearwardly extending frame part 13 the arrangement of the respective pulleys being the same as that shown in FIG. 4 for the other side.

In this way, winch 36 can be manually operated through handle 37 rotating through a reduction gear system to a cable drum 38, and rachet lock not shown specifically.

The gearing in the winch 36 in such that that together with the mechanical advantage of the cable system, the respective part of a motor vehicle such as that at 39, namely the front wheels, can be lifted sufficiently for catch 40 to engage peg 41 and thereby hold the supporting frame 3 and of course the towing frame 2 in an elevated positon for towing of the vehicle to be towed.

There is a spring loading on catch 40 such that this will ride over and automatically ensnare and hold over peg 41 but there is a cable which is not shown but which can be released through operation of handle 42 so that when desired, the catch 40 can be pulled into a non catching position hence allowing for the winch to take the load through the cables 21 and 22 and allowing for controlled lowering of the towing frame and specifically the supporting frame 3.

The towing frame is appropriately arranged to provide for conventional towing on public roads and includes a ball coupling 43 and an override brake 44.

The override brake 44 is connected through a flexible hydraulic cable to brake drums attached to each of the ground engagable wheels 6 and 7.

Some parts of the towing frame are adapted to provide for the most convenient fitting of a motor vehicle and accordingly there is provided an arm 45 and an arm 46 each of which are pivoted about an elongate horizontal axis at 47 and 48 such that if the wheel of a vehicle to be towed is of smaller diameter, the lever arm can be swung over to reduce the total distance between internal edges at 49 and 50.

A chain 51 can be fitted together with a hold down arm 52 whereby the wheel of a vehicle can be secured in a quick and appropriate manner for towing.

A feature of the arrangement described is that by locating the ground engagable wheels 6 and 7 out to each side of the area onto which the vehicle wheels will be supported, and then locating the vehicle wheels for towing, between the ground engagable wheels, provides signficant advantages in so far that the lifting and lowering mechanism can be a quite simple arrangement and does not require the somewhat elaborate mechanism provided by the so-called "Mobi-Jack" Patent concept.

The disadvantage of the arrangement described is that with some motor vehicles being towed, the angle at which the towing aid can be turned to while towing the motor vehicle can be restricted.

This is because self-evidently the side of the motor vehicle might ensnare the respective rear part of the ground engagable wheel or, of course, its mudguard but in practice this is not found to be a severe limitation and accepting this limitation provides for an extremely economic device which proves to be extremely convenient in practice and of not great size and therefore easily storable and relatively functional in use.

By providing that the outer ends of the supporting frame 3 are themselves supported with respect to the main system that is the towing frame 2 provides for significance advantage in terms of the total constructional strength necessary for the overall towing frame and this therefore provides also significant advantage both in terms of cost and its expected overall life.

The claims defining the invention are as follows:

1. A towing aid for wheeled vehicles comprising: a frame assembly havin a pair of transversely spaced-apart rearwardly extending arms; a pair of ground-engaging wheels rotatably supported by respective ones of the rearwardly extending arms; means mounting the rearwardly extending arms on the frame assembly at a position forward of the ground-engaging wheels for pivotal movement about a substantially transversely orientated horizontal axis; a support frame pivotably mounted on the frame assembly between the ground-engaging wheels for pivotal movement relative to the frame assembly between a lowered position to engage the front or rear wheels of a vehicle to be towed and a raised position elevated above the lowered position to support the wheels of the vehicle during towing of the vehicle; and means mounting the support frame for pivotal movement about a substantially vertical axis relative to the frame assembly.

2. A towing aid according to claim 1; wherein the support frame is positioned relative to the ground-engaging wheels such that the wheels of the vehicle will be supported thereon at a location in the vicinity of the ground-engaging wheels.

3. A towing aid according to claim 1; wherein the support frame is positioned relative to the ground-engaging wheels such that the wheels of the vehicle will be supported thereon in between the ground-engaging wheels.

4. A towing aid according to claim 1 or 2; wherein the support frame is located in between the ground-engaging wheels and is positioned to be below the uppermost height of the ground-engaging wheels when the towing aid lies on a horizontal plane.

5. A towing aid according to claim 1 or 2; including means for displacing the frame assembly between a wheel-receiving position and a towing position.

6. A towing aid according to claim 5; wherein the means for displacing comprises a cable interconnecting the frame assembly and support frame, and a winch for winding and unwinding the cable.

7. A towing aid according to claim 1 or 2; including means for displacing the frame assembly to a wheel-receiving position accompanied by downward pivotal movement of the rearwardly extending arms and lowering of the support frame to its lowered position and to a towing position accompanied by upward pivotal movement of the rearwardly extending arms and raising of the support frame to its raised position.

8. A towing aid according to claim 7; wherein the means for displacing comprises a cable interconnecting the frame assembly and support frame, and a winch for winding and unwinding the cable.

* * * * *